United States Patent [19]

Sebillaud

[11] Patent Number: 5,476,047
[45] Date of Patent: Dec. 19, 1995

[54] LINEAR MOTOR TYPE HANDLING DEVICE INCLUDING MOBILE ELEMENTS TRAVELLING OVER A NETWORK

[75] Inventor: Jean Sebillaud, Champigny, France

[73] Assignee: Matflex, Ivry-Sur-Seine Cedex, France

[21] Appl. No.: 258,290

[22] Filed: Jun. 10, 1994

[30] Foreign Application Priority Data

Jun. 24, 1993 [FR] France ................................. 93 07683

[51] Int. Cl.⁶ ............................... B60L 13/00; B61B 3/00
[52] U.S. Cl. ............................ 104/290; 104/294; 104/94
[58] Field of Search ................................. 104/290, 294, 104/245, 89, 91, 94; 105/155; 310/12, 13

[56] References Cited

U.S. PATENT DOCUMENTS

| | | | |
|---|---|---|---|
| 3,675,585 | 7/1972 | Wiart et al. | 104/290 X |
| 3,802,349 | 4/1974 | Guimbal | 104/294 X |
| 3,911,828 | 10/1975 | Schwarzler | 104/290 X |
| 4,172,229 | 10/1979 | Guimbal | 104/294 X |
| 4,388,543 | 6/1983 | Guimbal | 104/290 |
| 4,408,139 | 10/1983 | Schwarzler | 104/290 X |
| 4,922,830 | 5/1990 | Fujita et al. | 104/290 |

FOREIGN PATENT DOCUMENTS

| | | |
|---|---|---|
| 0160523 | 11/1985 | European Pat. Off. . |
| 2064773 | 7/1971 | France . |
| 2382792 | 9/1978 | France . |

*Primary Examiner*—Robert J. Oberleitner
*Assistant Examiner*—Kevin D. Rutherford
*Attorney, Agent, or Firm*—Nikaido, Marmelstein, Murray & Oram

[57] ABSTRACT

The invention relates to a handling device including a track (1) constituting a travel path for one or more mobile elements, the said mobile elements being driven by a linear electric motor composed of an inductor (42, 43) carried by the mobile element and extending parallel to the track, and of an armature (4, 5) carried by the track and extending along the latter in such a way as to be able to cooperate with the inductor.

According to the invention, the said inductor (42, 43) and the said armature (4, 5) have, as viewed in cross section, the former, a rectangular shape defining three active faces and one inactive face, and the second, a U shape defining three active faces and suitable for housing the inductor in such a way that the respective active faces of the inductor and of the armature cooperate with one another, two by two.

6 Claims, 3 Drawing Sheets

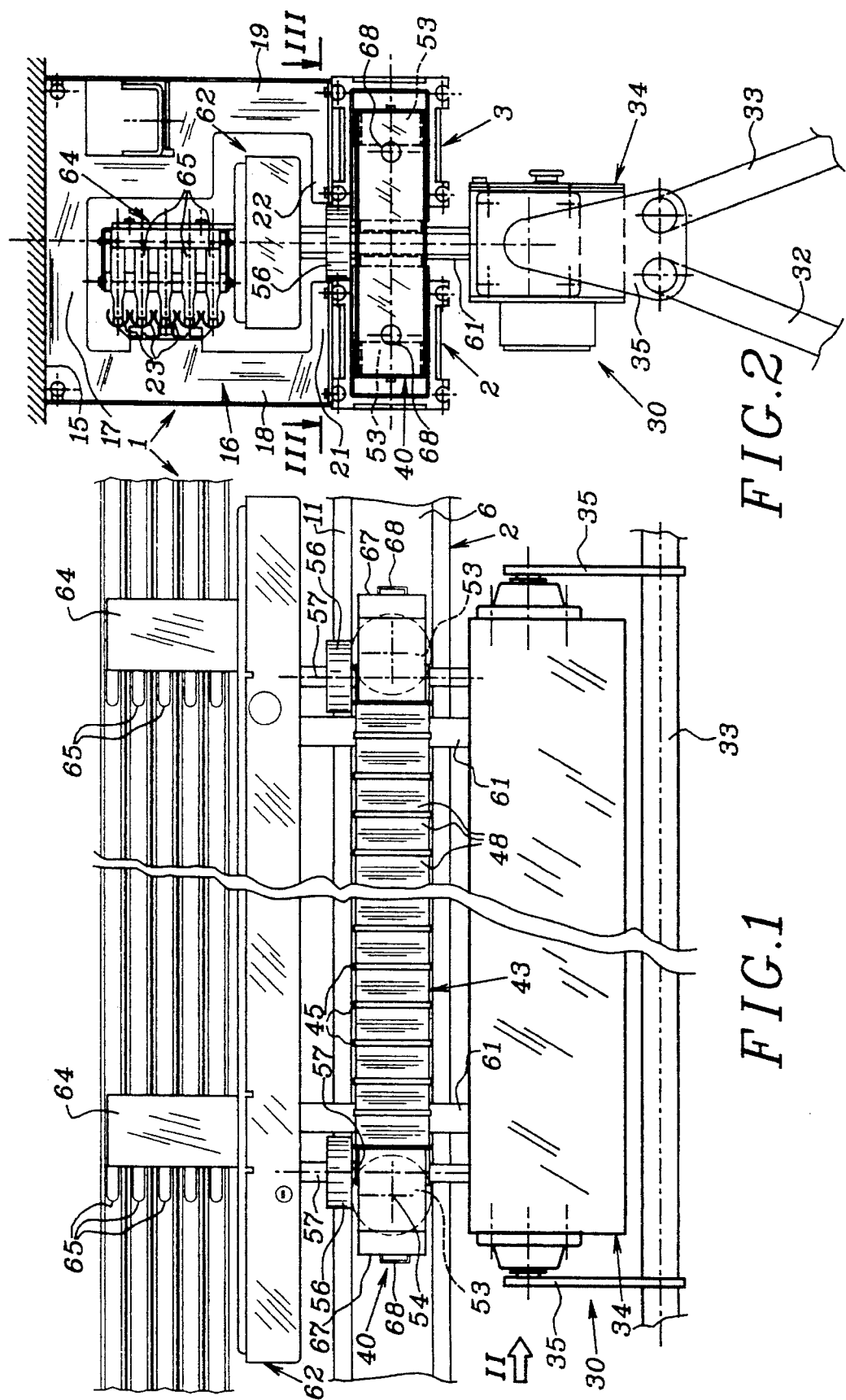

LINEAR MOTOR TYPE HANDLING DEVICE INCLUDING MOBILE ELEMENTS TRAVELLING OVER A NETWORK

The invention relates to a handling device including a track extending over a determined route and constituting a travel path for one or more mobile elements disposed along it, the said track comprising guide means for the mobile elements, the said mobile elements each comprising travelling means for cooperating with the said travel path and drive means for ensuring their individual movement along the track, the drive means including a linear electric motor composed of an inductor borne by the mobile element and extending parallel to the track, including a plurality of magnetic poles distributed along the inductor and between which are placed a plurality of coils of conducting wire, and of an armature borne by the track and extending along it so as to be able to coperate with the inductor, a spark gap of predetermined width being interposed therebetween.

The problem that the invention aims to solve is that of providing a device of this type in which the inductor and the armature of the linear motor are mutually configured in such a way that the magnetic losses are minimized, and that they are easily integrated into the general structure of a linear track.

According to the invention, the said inductor and the said armature have, as viewed in cross section, the former, a rectangular shape defining three active faces and one inactive face and the latter, a U shape defining three active faces suitable for housing the inductor so that the respective active faces of the inductor and of the armature cooperate with each other, two by two.

Further details and advantages of the invention will emerge in the course of the following description of a number of preferred, but non-limitative, forms of embodiments, with reference to the annexed drawings, wherein:

FIG. 1 is a partial view in side elevation of a mobile element according to a first form of embodiment of the invention, suspended from the track of the handling device, one of the rails of this track being removed;

FIG. 2 is a side view of the mobile element of FIG. 1, in the direction of arrow II of this figure;

Figure 3:
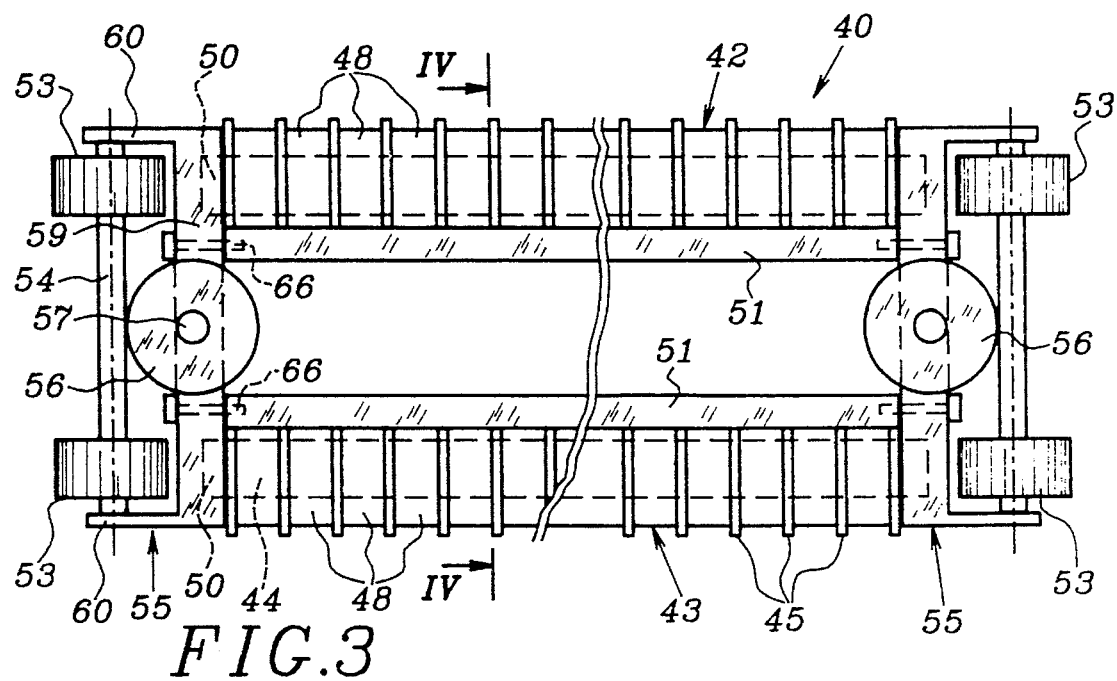
FIG. 3 is a top view of the mobile element driving means, viewed along line III—III of FIG. 2.
Figure 4:
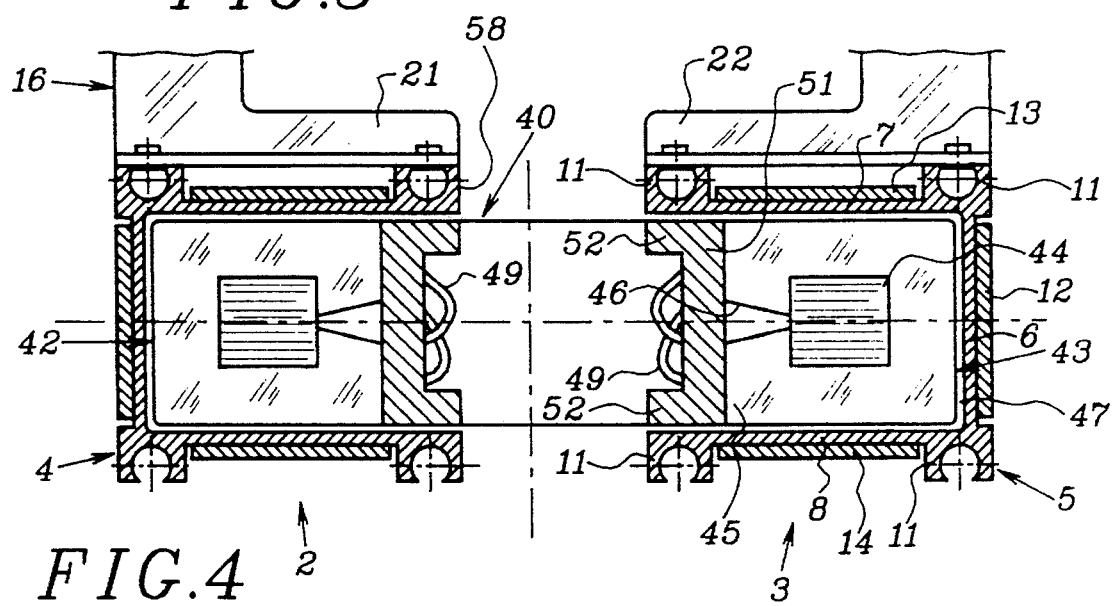
FIG. 4 is a cross-sectional view of the means for driving the mobile element, viewed along line IV—IV of FIG. 3.

The handling device shown in FIGS. 1, 2 and 4 includes a track 1 chiefly constituted by two rails, 2, 3, extending longitudinally over the entire length of the track. Each rail 2, 3, is constituted by a channel 4, 5 having a generally U-shaped cross section with a base 6 and two wings 7, 8 extending the said base along two opposite sides. Wings 7, 8 extend, in this example, over a width a little greater than that of base 6. Each U-shaped channel 4, 5 has two pairs of rims 11 projecting outwardly on its two wings 7, 8 respectively, one rim 11 being located along a free edge of wing 7, 8 and the other between the wing 7, 8 and the base 6. These edges are hollowed out in a manner known per se to permit assembly between different portions of rails 2, 3 disposed end to end along track 1, by means of assembly rods, not shown. Each U-shaped channel 4, 5 is made of a material that is a good conductor of electricity, in particular aluminium.

Each U-shaped channel 4, 5 is covered externally by three longitudinal plates 12, 13, 14, extending respectively against base 6 and the two wings 7, 8 of each channel, substantially covering the entire surface thereof located between the rims 11. These plates are made of a ferromagnetic material such as steel. They are fixed to each channel 4, 5 so as to permit differential expansion between the two materials: use can be made, in particular, of bonding or of abutment means arranged to hold the plates in contact with the channel with a certain amount of play.

Rails 2, 3 are suspended from a supporting longitudinal member 15 by means of several mounting brackets 16, one of which is shown in FIG. 2, these brackets being distributed along the track. Each mounting bracket 16 is generally C-shaped, having a base 17, two perpendicular wings 18, 19 and two rims 21, 22 respectively prolonging the wings, perpendicularly thereto. Each mounting bracket 16 is fixed by its base 17 to the supporting longitudinal member 15. Its rims 21, 22 have a length substantially corresponding to the width of wings 7, 8 of the U-shaped channels of the rails, these wings being respectively fixed to rims 21, 22 so that the two rails 2, 3 are disposed opposite one another.

Wing 18 of each mounting bracket 16 supports five juxtaposed electrical contact tracks 23, extending along the track, three of which are connected respectively to the three phases of a three-phase electric power supply mains, the fourth of which is grounded, and the fifth of which is connected to a device for controlling the handling device.

Figure 5:
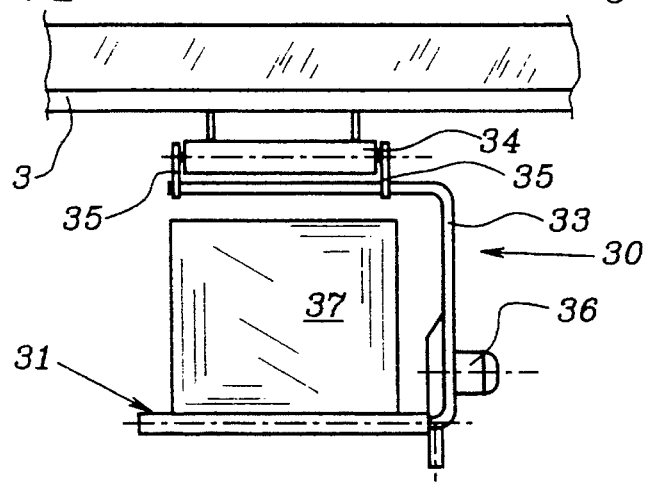
FIG. 5 is a side elevation view of a swing member equipping each mobile element according to the invention.

On track 1 are placed several mobile members independent of one another, one of which, 30, can be seen in FIGS. 1, 2 and 5. Each mobile element includes a horizontal platform 31 suspended by a hanging means, including two juxtaposed L-shaped arms 32, 33, from a parallapipedic box 34 via two fixing plates 35. Platform 81 is covered by a conveyor belt driven by an electric motor 36 and permitting the automatic lateral loading or unloading of a package 87 placed on platform 31.

Box 34 is suspended from a motor unit 40 disposed in rails 2, 3 and designed to drive mobile element 30 along the track. Motor unit 40 essentially includes two identical linear motor inductors 42, 43.

Each inductor includes, in a manner known per so, an elongated magnetic core 44 having a rectangular cross section and formed of several superposed strips of ferromagnetic material such as steel, electrically insulated from one another. On core 44 are mounted twenty or so magnetic poles 45, each one being constituted by a thin crown element of square cross section, made of steel. Each pole 45 surrounds the core 44 with the exception of a region facing the other inductor, in which the pole comprises a narrow V-shaped notch 46. Each pole 45 is of dimensions such that it is received in corresponding U-shaped channel 4, 5, a narrow gap 47 being provided along base 6 and wings 7, 8 of the said channel.

Between any two poles 45 of each inductor is disposed a coil of conducting wire 48, wound around core 44 in a plurality of turns. The coils are grouped together in a plurality of sets of three coils each, juxtaposed along the core 44, the coils in each set corresponding respectively to the three phases of the electric mains.

In a manner known per se, a magnetic field reflector 51 is provided for each inductor and is constituted by a plate that is thicker than those, 12 to 14, provided for the U-shaped channels 4, 5, which reflector extends over substantially the entire length of the inductor and comes to bear on a face thereof bearing notches 46. The reflector has two perpendicular rims 52, facing the other inductor and flush with the free edge of wings 7, 8 of U-shaped channel 4, 5. It is made of a material that is a good conductor of electricity, such as aluminium, and it enables magnetic losses to be limited.

The coils 48 are connected to one another by means of connecting leads 49 passing through the reflector.

The two inductors 42, 43 are interconnected by two yokes 55 in such a way that they extend parallel to one another at a distance corresponding to that existing between rails 2, 3 of the track. Each yoke is in the shape of a U including a base 59 bordered by two wings 60. Base 59 is pressed against two adjacent ends of the two inductors 42, 43, and its thickness is sufficient to house, in two recesses, two ends 50 of the inductor cores 44 that project beyond a last magnetic pole 45. Base 59 of each yoke 55 is fixed to an end face of the two inductor reflectors 51 by means of screws 66.

Rails 2, 3 of the track constitute, in respect of inductors 42, 43, the armatures of the two linear motors. The U-shaped channels 4, 5, by virtue of their conductive characteristics, ensure the flow of the induced currents generated by the variable magnetic fields derived from the inductors, while, by virtue of their magnetic characteristics, plates 12 to 14 ensure the closing of the magnetic fields. Surprisingly, the Applicant has discovered that the absence of a ferromagnetic layer in the region of rims 11 of each U-shaped channel did not lead to significant magnetic losses. It is this discovery that has enabled it to contemplate designing rails 2, 3 in a form that is simple to manufacture, namely that of a U-shaped conductive channel to which are added ferromagnetic plates, rather than in the form of a two-layer U-shaped channel including a conductive layer and a ferromagnetic layer.

The three faces of each inductor 42, 43 cooperating with the respective armature 2, 3 are said to be "active", while its face carrying reflector 51 is said to be "inactive".

Motor unit 40 carries means for enabling mobile element 30 to travel and be guided along track 1. There are, first of all, two pairs of bearing wheels 53, disposed respectively at two ends of motor unit 40. Each wheel is placed approximately in prolongation of core 44 of the adjacent inductor and is rotationally mounted on a shaft 54 extending substantially in the median longitudinal plane of the motor unit. This shaft is borne by wings 60 of yoke 55. The arrangement is such that yoke 55 and bearing wheels 53 do not project laterally in relation to the motor unit. On the other hand, the bearing wheels project slightly above and below the motor unit so as to be able to bear respectively on the lower two wings 8 of the U-shaped channels of the armatures, a clearance being provided between the bearing wheels 53 and the upper wings 7 of these channels.

The means for laterally guiding motor unit 40 in rails 2, 3 include two guide rollers 56 disposed respectively in the vicinity of the two ends of the motor unit, on an upper face of the latter. Each guide roller 56 is disposed parallel to the upper face of the motor unit and is mounted so as to journal on a shaft 57 passing through the thickness of base 59 of yoke 55. The diameter of each guide roller is such that the latter is received with a small amount of clearance between the upper rims 11 of the two U-shaped channels 4, 5 of the armatures (FIGS. 2), the latter serving it as guide rails and having for this purpose a plane guiding surface 58 (FIG. 4), perpendicular to the adjacent wing 7 of the U-shaped channel 4, 5. In this example, each guide roller 56 has a thickness that is a little greater than the height of the said guide surface 58.

The two ends of motor unit 40 are covered by two caps 67 (FIGS. 1, 2) bearing signal transmitting and receiving means 68 permitting the prevention of any collision between two successive mobile elements and possible adaptation of their respective speeds.

Box 34 from which is suspended platform 31 of the mobile element contains electronic means permitting automatic control of the movement of the mobile element along track 1 and of its braking as a function of its destination and the other neighboring mobile elements travelling over the same track; if contains, in particular, an automaton and associated electronic circuits.

Mobile element 30 is equipped with another parallelepipedic box 62. It extends, in this example, over a length greater than that of motor unit 40 and is disposed above the latter and parallel thereto. This second box 62 contains electricity supply means for supplying the first electronics box 34 at low voltage (24 V) from the aforementioned three-phase mains: it contains, in addition to the electronics supply, associated electrical devices such as circuit breakers, static relays and a circuit for detecting the position of the mobile element along the track.

The second box 62 has, on an upper face, two wiper contact supports 64 spaced apart from one another along the box and each carrying five electric wiper contacts 65 arranged to cooperate respectively with the five electric contact tracks 23 borne by the fixing brackets 16. These wiper contacts enable the second box 62 to be supplied with the necessary electrical energy, as well as with a remote control signal, at any position of the mobile element along the track and during its movement. The first box 34 is electrically connected to the second box 62 to receive therefrom its electricity supply and to exchange control signals.

The two boxes, 34, 62, are fixed to the motor unit 40 by the two shafts 57 of the guide rollers, which extend on either side of the motor unit. The electrical connecting leads between these boxes are housed in two tubular sheaths 61 disposed in the vicinity of the two ends of the motor unit and extending parallel to the shafts 57, between the two inductors.

In operation, the power supply of the windings of the inductors 42, 43 of the motor unit 40 generates magnetic forces causing the mobile element to be displaced along the track. The U-shaped configuration of the track with two rails 2, 3 advantageously makes it easy for the mobile element to negotiate the points.

The presence of bends on the track leads to local increases in the spark gap, and thus to a reduction in motive force which has to be taken into account at the design stage. This remark also applies to any curves occurring in the vertical plane: apart from the increase in the spark gap, care must be taken here to limit the radius of curvature so that the bearing wheels 53 are always in contact with the track and that the inducers 42, 43 do not rub against the lower wing 8 of the U-shaped channels 4, 5 of the rails. This latter problem can be solved by locally providing running tracks that are raised in relation to the wings 8 of the channels, for example tracks built onto the rails.

The handling device according to the invention enables mobile elements to be moved at a relatively moderate speed of 2 m/s. This is achieved, on one hand, by limiting the spacing between the poles 45 of the inductors and, on the other hand, by using suitable electronic control systems.

Figure 6:
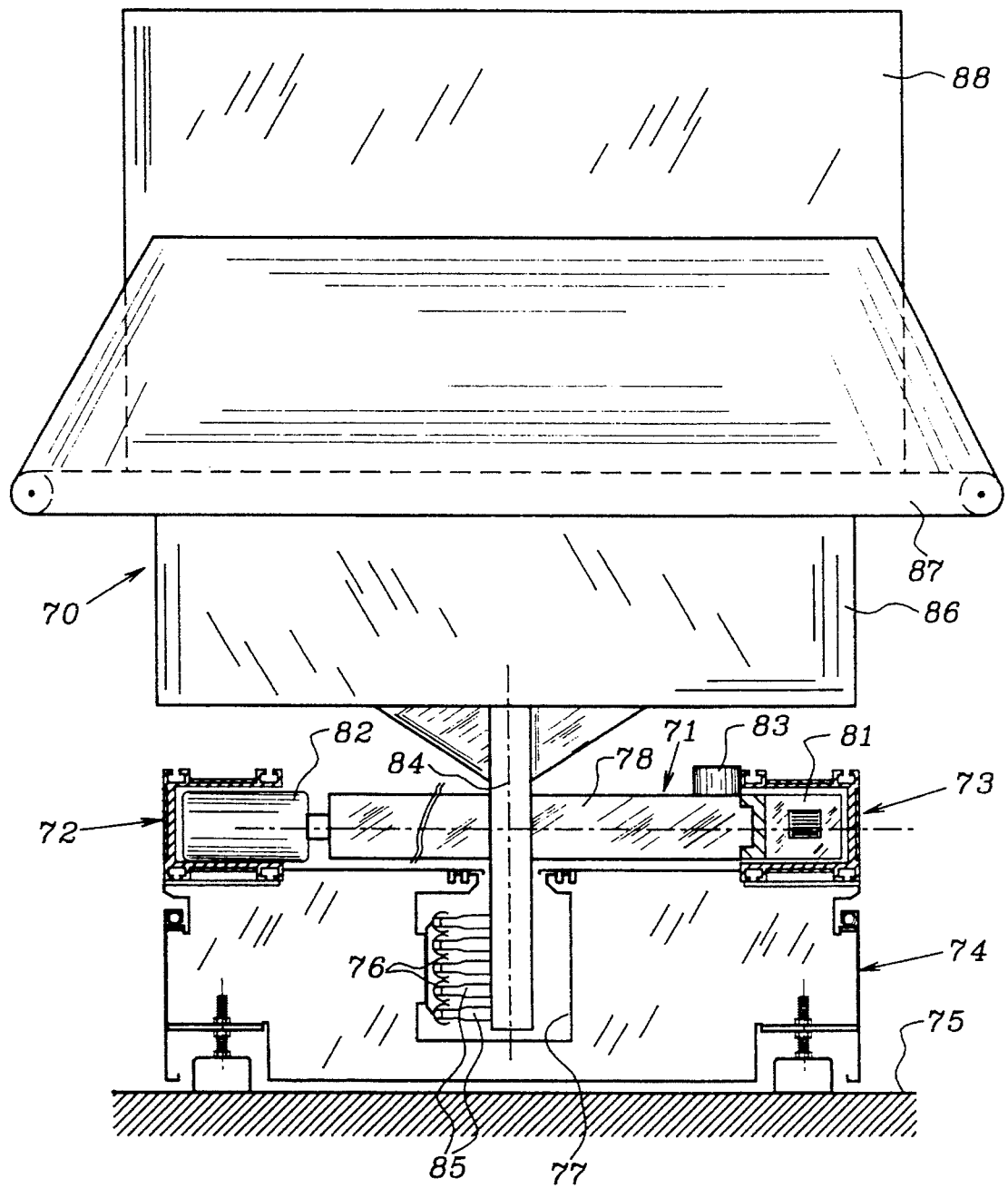
FIG. 6 is a side elevation view of a mobile element according to a second form of embodiment of the invention.

The variant in FIG. 6 essentially differs from the preceding one in that mobile element 70 is no longer suspended from the motor unit 71 but is, on the contrary, fixed above it. In this case, the rails 72, 73 of the track are spaced further apart from one another in order to give the mobile element 70 the necessary stability. They are mounted on a frame 74 resting on the ground 75. The electrical contact tracks 76 are disposed in a longitudinal recess 77 in the frame.

The motor unit 71 includes a chassis 78 extending substantially in one plane, parallel to ground 75, and on which are fixed, on one hand, the two inductors 81 and, on the other hand, the four bearing wheels 82 and, finally four guide rollers 83 cooperating two by two with an edge of rails 72, 73.

Chassis 78 carries cross members 84 to which are fixed, on one hand, mobile element 70, at one end, and, on the other hand, electrical wiper contacts 85, at the other end.

Mobile element 70 includes a box 86 grouping together all the electric power supply circuits and the electric control circuits, topped by a platform 87 with a conveyor belt supporting a package 88. Box 86 is fixed to the cross members 84 of the chassis of the motor unit.

I claim:

1. Handling device including a track (1) extending over a determined route and constituting a travel path for one or more mobile elements (30) disposed along it, the said track comprising guide means (58) for the mobile elements, the said mobile elements each comprising travelling means (53) for cooperating with the said travel path and drive means (40) for ensuring their individual movement along the track, the drive means including at least one linear electric motor each composed of an inductor (42, 43) borne by the mobile element and extending parallel to the track, including a plurality of magnetic (45) poles distributed along the inductor and between which are placed a plurality of coils of conducting wire (48), and of an armature (4, 5) borne by the track and extending along it so as to be able to cooperate with the inductor, a spark gap of predetermined width being interposed therebetween, characterized in that the said inductor (42, 43) and the said armature (4, 5) have, as viewed in cross section:

the former, a rectangular shape defining three active faces and one inactive face, and the second, a U shape defining three active faces and adapted to house the inductor in such a way that the respective active Faces of the inductor and of the armature cooperate with one another, two by two;

the said travel path of the track being constituted by one of the said active faces (8) of the armature, the travelling means (53) of each mobile element bearing upon the said face.

2. Device according to claim 1, wherein said at least one linear motor includes two linear electric motors, comprising:

two respective inductors (42, 43) carried by the mobile element, juxtaposed so as to extend parallel to one another, their respective inactive faces being located opposite one another; and two respective armatures (4, 5) carried by the track, juxtaposed so as to extend parallel to one another and facing one another.

3. Device according to one of claims 1 or 2, wherein the said guide means include a longitudinal free edge (58) defined by the said U shape of the armature (4, 5).

4. Device according to claim 2, wherein the two armatures (4, 5) of the track extend in a generally substantially horizontal plane, the said travel path of the track being constituted by two respective active faces (8) of the two armatures extending horizontally at a lowest level.

5. Device according to any one of claims 1, 2 or 4, wherein each armature includes:

a channel (4, 5) extending along the track and having the said U shape, made of a material that is a good conductor of electricity; and three longitudinal plates (12 to 14) having dimensions corresponding substantially to those of the three active faces of the said armature and disposed respectively against three external faces of the said channel, opposite the said three active faces, these plates being made of a ferromagnetic material.

6. Device according to claim 5, wherein the said guide means include a longitudinal free edge (58) defined by the said U shape of the armature (4, 5).

* * * * *